United States Patent Office 2,736,384
Patented Feb. 28, 1956

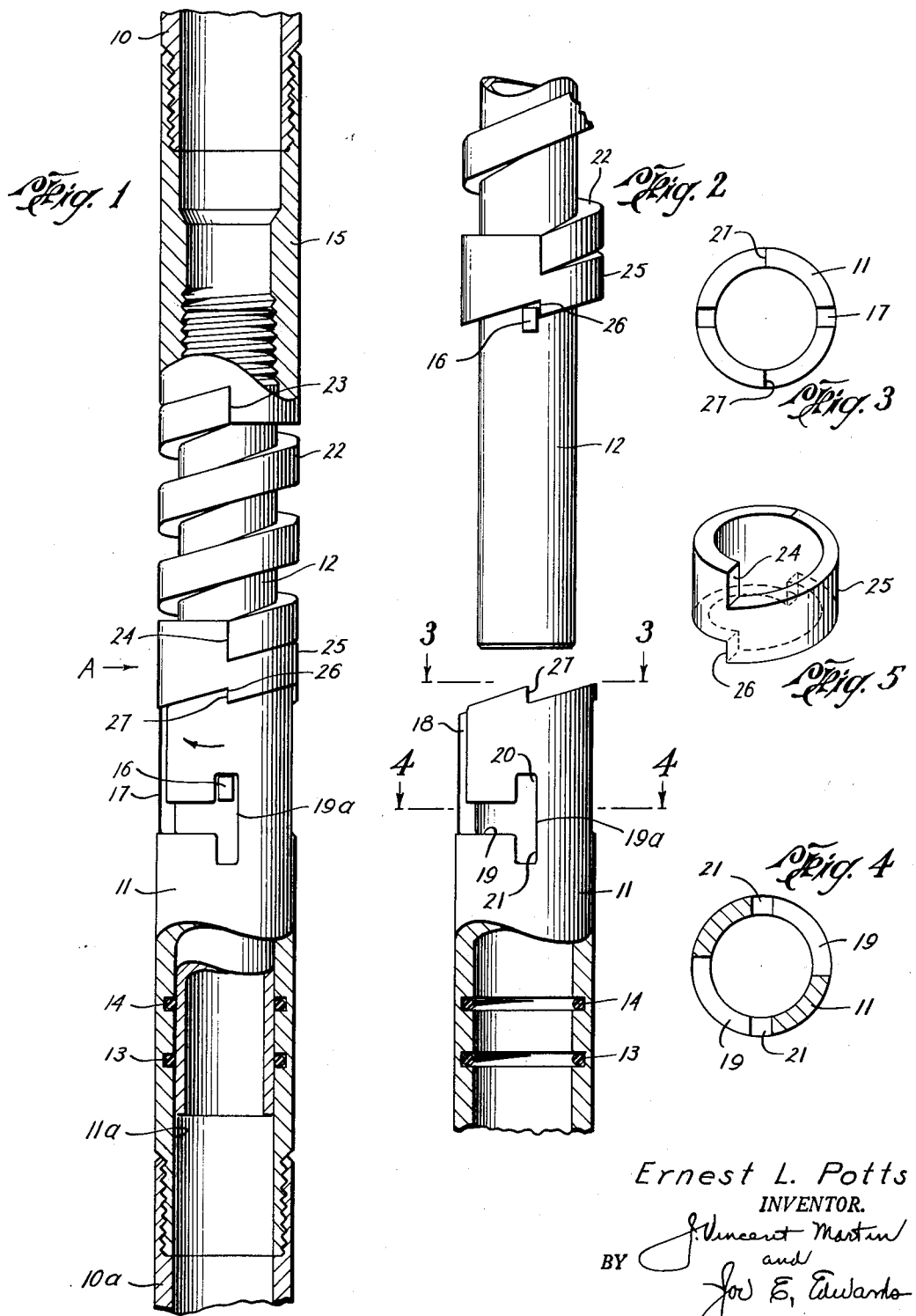

2,736,384

RELEASABLE COUPLING DEVICES

Ernest L. Potts, Houston, Tex., assignor to
Cicero C. Brown, Houston, Tex.

Application October 16, 1950, Serial No. 190,256

10 Claims. (Cl. 166—220)

This invention relates to new and useful improvements in releasable coupling devices.

One object of the invention is to provide an improved releasable coupling device adapted to be connected in a well pipe, such as a drilling or tubing string, which device functions as a normal coupling element under ordinary conditions but may be quickly and easily disconnected in the event the pipe therebelow becomes stuck, whereby the pipe above the device may be withdrawn from the well bore.

An important object of the invention is to provide an improved releasable coupling device which may be employed as a safety joint in a well pipe and which is so constructed that when in its connected position, the pipe may be rotated in either direction for the purpose of operating well tools carried by the pipe without any danger of unintentionally or inadvertently releasing or disconnecting said device.

Another object is to provide a releasable coupling device which does not employ a threaded connection between the separable members of the device, whereby the disadvantages of such threaded connection are eliminated.

A further object is to provide a coupling device, of the character described, wherein the members thereof are normally coupled to each other and wherein the members are capable of relative axial movement with respect to each other, whereby the device may be utilized to impart a jar in either direction to the well pipe in which the device is connected.

A particular object is to provide an improved releasable coupling wherein the normally connected members of the coupling are adapted to be released by initially setting up a torque in the pipe and subsequently imposing a weight through the pipe string upon the coupling, whereby disconnection of the coupling members is automatically and positively accomplished.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view, partly in section and partly in elevation, of a releasable coupling device, constructed in accordance with the invention, showing the members thereof in coupled position, Figure 2 is a partial view of the device, illustrating the members thereof uncoupled, Figure 3 is a horizontal, cross-sectional view taken on the line 3—3 of Figure 2, and Figure 4 is a horizontal, cross-sectional view taken on line 4—4 of Figure 2, and Figure 5 is an isometric view of the floating collar which retains the spring when the coupling members are uncoupled.

In the drawings, the letter A designates a releasable coupling constructed in accordance with the invention and adapted to connect an upper section 10 of well pipe with a lower section 10a of said well pipe. The coupling A is arranged to normally connect the pipe sections together whereby said pipe sections may be rotated in either direction; in the event that the lower pipe section 10a becomes stuck within the well bore, the coupling A, as will be explained, is adapted to quickly and easily disconnect the two pipe sections, whereby the upper section of well pipe may be withdrawn from the bore. The coupling A is also constructed so that prior to disconnection or release of the device, an upward or downward jar may be imparted to the lower section 10a of well pipe, to attempt to release this portion of the pipe.

As is clearly shown in Figure 1, the coupling A includes an outer tubular sleeve 11 which has its lower end externally screw-threaded whereby it may be connected to the upper end of the lower pipe section 10a. A tubular mandrel 12 telescopes the outer sleeve 11 and has an external diameter substantially equal to the diameter of the bore 11a of said sleeve and suitable sealing rings 13 which are mounted within annular grooves 14 formed within the wall of the bore of the sleeve seal off between the inner mandrel 12 and the bore of said sleeve. The upper end of the tubular mandrel 12 is connected with a coupling collar 15 which in turn is connected to the lower end of the upper section 10 of the well pipe.

The inner mandrel 12 which has connection with the upper section 10 of the well pipe and the sleeve 11 which has connection with the lower section 10a of the well pipe are arranged to be releasably connected to each other by means of a pair of diametrically opposed projections 16 provided on the inner mandrel which engage within complementary diametrically opposed slots 17 formed in the outer sleeve 11. Each slot 17 has a longitudinal portion 18 (Figure 2) which extends downwardly from the upper end of the sleeve 11, and the lower end of this longitudinal portion communicates with the lateral portion 19 which extends partially around the sleeve. The lateral portion 19 of each slot 17 terminates in an upwardly directed offset 20 and a downwardly directed offset 21. Each projection 16 which is secured to the outer surface of the inner mandrel extends into its slot 17 and when the inner mandrel and outer sleeve are coupled together each projection 16 is in the offset 20 of said slot, as shown in Figure 1. In this position of each projection 16 with respect to its slot 17, it will be evident that a rotation of the mandrel 12, as caused by a rotation of the well pipe 10, will be imparted to the sleeve and therefore to the lower pipe section; such rotation may obviously be in either direction since the projections 16 are confined in their respective offsets 20.

For normally maintaining each projection 16 within the offset portion 20 of its connecting slot 17, a coil spring 22 surrounds the mandrel 12 and is confined between the coupling collar 15 and the upper end of the outer sleeve 11 of the device. The spring 22 has its extreme upper end engaging a radially disposed shoulder 23 formed in the lower end of the coupling collar 15 and the extreme lower end of the spring engages a shoulder 24 which is provided in the upper edge portion of a clutch collar 25. The clutch collar 25 is interposed between the spring and the upper end of the outer sleeve 11 and is freely rotatable about the mandrel 12. The lower end of the clutch collar 25 is formed with a pair of diametrically opposite clutch teeth or shoulders 26 which are adapted to engage complementary shoulders 27 provided on the upper surface of the outer sleeve 11.

When the coil spring 22 is confined between the coupling collar 15 and the clutch collar 25, said spring is placed under a predetermined torsion, whereby it is tending to unwind. With this arrangement the ends of the spring being confined by the shoulder 23 of the coupling collar 15 and by the shoulder 24 of the clutch collar, will exert its torsional strength to rotate the clutch collar 25 in a direction maintaining the clutch teeth 26 in engagement with the shoulders or abutments 27 on the sleeve. At the same time, the spring 22 will exert its pressure to urge the coupling collar 15 and the mandrel 12 attached thereto upwardly with respect to the outer sleeve, and this action will tend to extend the mandrel 12 with respect to the sleeve. It is this pressure of the spring 22 which maintains the projections 16 on the mandrel within the upper offsets 20 of the connecting slots 17.

The purpose of the clutch collar 25 is to prevent a displacement of the coil spring 22 when the mandrel 12 is separated from the outer sleeve, as illustrated in Figure 2. Upon this separation, as will be explained, the spring will force the clutch collar 25 downwardly until the collar engages the projection 16 on the mandrel and at this time the clutch collar will function as a retainer to prevent displacement of the spring. It is pointed out that the clutch collar 25 could be completely eliminated and the lower end of the spring 22 engage a shoulder or abutment formed on the upper end of the sleeve 11; however, if the clutch collar was not provided a subsequent separation of the mandrel 12 from the outer sleeve 11 might result in a displacement of the spring 22 from the mandrel, and for this reason it is desirable to interpose the clutch and retaining collar 25 between the spring and the outer sleeve 11, as illustrated in Figure 1.

In the operation of the releasable coupling A, the parts are assembled as illustrated in Figure 1 with the inner mandrel 12 having connection with the upper section 10 of the well pipe and the outer sleeve 11 having connection with the lower section 10a of the well pipe. At this time the coil spring 22 is confined between the coupling collar 15 and the outer sleeve 11, with the clutch collar 25 being interposed between the sleeve and the lower end of the spring. As has been noted, the spring is not only compressed so as to constantly urge the inner mandrel 12 toward an extended position with respect to the outer sleeve 11 but said spring is also in torsion and due to its engagement with the shoulders 23 and 24 is tending to rotate the sleeve 11 in a direction as indicated by the arrow in Figure 1 with respect to the mandrel. Thus, the pressure and tension of the spring 22 functions to maintain the projections 16 in the upper ends of the offsets 20 of the connecting slots and also functions to maintain the end wall 19a of each slot in contact with its projection. It is therefore evident that the upper section 10 of well pipe may be rotated and through the mandrel 12, projections 16 and connecting slots 17, and then through the sleeve 11 may impart a rotation to the lower section 10a of the well pipe. Because each projection 16 is confined within the offset 20 of its connecting slot 17, it is obvious that rotation will be imparted from the upper section 10 of the well pipe to the lower section 10a of said pipe. So long as the conditions remain normal, the device A merely functions as an ordinary coupling within the pipe string.

In the event that the lower section 10a of well pipe becomes stuck within the well bore, it is desirable to attempt to release this stuck portion before disconnecting the coupling device. In such case the arrangement of the projections 16 and connecting slots 17 will permit an attempt to rotate the lower section 10a. If this is not sufficient to release the pipe, the inner mandrel 12 may be telescoped a limited distance with respect to the outer sleeve 11 since the projections 16 may move from the upper offsets 20 to the lower offsets 21 of the slots 17, the spring 22 maintaining the end walls 19a of the slots in contact with the projection. Thus, by means of the projections 16, a downward or an upward jar may be imparted to the outer sleeve 11, with this jar being transmitted to the lower section 10a of the well pipe. Therefore, when the lower section 10a first becomes stuck within a well bore the coupling device A permits either an attempt to rotate the stuck section or allows an upward and downward jar to be imparted thereto. In many instances the rotation and jarring may release the stuck pipe.

In the event that the lower stuck section 10a of well pipe cannot be released, it is then desirable to disconnect the upper section 10 from the stuck section 10a, and this is effected by a separation of the mandrel 12 from the outer sleeve 11. To effect this separation, the upper section 10 of well pipe is rotated in a direction which will tend to move the projections 16 into contact with the walls of the offset 20 opposite the end walls 19a of the slots, which is the same direction in which the torsion of the spring is acting on the sleeve 11; ordinarily this rotation does not result in winding the spring tighter but places a torque in the upper section 10 of the well pipe and in the mandrel 12. The rotation of the upper section 10 of the well pipe is continued until a desired torque is built up within the pipe 10, and this torque will, of course, be transmitted downwardly to the inner mandrel 12 which is connected therewith and which carries the projections 16.

After a sufficient torque has been built up in the upper pipe section 10, the weight of the pipe is imposed upon the mandrel 12 to cause said mandrel to telescope the sleeve 11, and this moves the projections 16 downwardly out of the upper offsets 20 of the respective slots 17. As the projections move downwardly and opposite the lateral portions 19 of the slots 17, it will be evident that the torque which has been built up in the pipe and which is tending to return the pipe to a normal position will immediately rotate the projections 16 with respect to the sleeve, moving the projections through the lateral portion 19 of the slots and into alignment with the longitudinal portion 18 of said slots. It is to be noted that since the spring 22 is under torsion it tends to urge the projections 16 and the end walls toward each other, but the torsion developed in the mandrel 12 and the pipe 10 upon a clockwise rotation (viewed from the top of the tool in Figure 1) tends to move the projections 16 and walls 19a away from each other. Thus, since the pipe 10a and sleeve 11 are stuck against rotation, the projections 16 will be moved through the lateral slots 19 when aligned therewith and when the torque in the pipe 10 and mandrel 11 exceeds the torque in the spring 22. Therefore, it will be appreciated that since the torque in the spring 22 must be overcome to disconnect the members 11 and 12, any slight unintentional rotation of the pipe 10 or mandrel 12 will not release the projections 16 during their movement to and from the upper and lower offsets 20 and 21.

When the projections 16 are aligned with the longitudinal portions 18 of the slots 17, it will be obvious that an upward movement of the upper pipe section 10 and mandrel 12 will result in the mandrel moving upwardly out of the outer sleeve 11 to separate the complementary parts of the coupling device. The upper pipe section may thus be removed from the well bore, leaving the lower stuck section 10a and outer sleeve 11 of the coupling within the well bore. As pointed out, the clutch collar 25 will, upon separation of the mandrel 12 from the sleeve 11, engage the projections 16 to prevent displacement of the spring from the mandrel to thereby assure recovery of the spring when the pipe section 10 and mandrel are brought to the surface.

From the foregoing it will be seen that a coupling device is presented which functions in a completely normal manner under normal operating conditions. The device permits rotation of the pipe in either direction during normal operation and also allows a limited telescoping movement of the mandrel 12 with respect to the outer sleeve 11 without effecting a disconnection. When and if it is desirable to disconnect the complementary members of the coupling device, it is only necessary to impart a rotation to the upper section 10 of the well pipe to place a torque in this pipe section. When the pipe section 10 is placed under a torque and is then moved downwardly to locate the projections 16 opposite the lateral portions 19, the unwinding of the pipe, which will, of course, be an inherent function of a pipe under torque, will result in each projection 16 being moved opposite the longitudinal portion 18 of the connecting slots 17. The unwinding or rotation of the pipe 10 which has been previously placed under a torque will, of course, continue until the projections 16 strike the wall of the longitudinal portion 18 of each slot, and thereafter an upward movement of the pipe section 10 will remove the mandrel 12 from the outer sleeve 11.

There are no threads in the connection and actually the releasing of the coupling is effected automatically by first placing a torque in the pipe and then moving the pipe downwardly a sufficient distance to align each projection 16 with the lateral portion 19 of its respective slot. The usual disadvantages of having to rotate to disconnect threads are completely eliminated. Also, when the coupling is in its connected position, a rotation in either direction through the coupling may be accomplished. Also a limited telescoping movement which will permit some jarring operation to be carried out prior to disconnection is possible with the device. As has been noted, the clutch collar 25 is preferable but if desired may be omitted, in which event the lower end of the spring 22 will directly engage a shoulder provided for the purpose on the outer sleeve 11. The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A releasable coupling device including, an outer tubular member adapted to be connected to the upper end of a section of well pipe, an inner member telescoping the outer member and connected to the lower end of a second section of well pipe, the outer member having a slot therein which is formed with a vertical leg having an open end, a lateral leg and a vertical offset portion at the end of the lateral leg, a projection on the inner member engageable within the offset portion for coupling the members together, and a resilient torque means acting on said inner member and said outer member for maintaining said projection within said offset portion during longitudinal movement of said projection in said offset portion to maintain the members in coupled position while applying a jarring action from said inner member to said outer member.

2. A releasable coupling device including, an outer tubular member adapted to be connected to the upper end of a section of well pipe, an inner member telescoping the outer member and connected to the lower end of a second section of well pipe, the outer member having a slot therein which is formed with a vertical leg extending from the upper end of the outer member, a lateral leg and a vertical offset portion at the end of the lateral leg, a projection on the inner member engageable within the offset portion for coupling the members together, an enlargement on the inner member spaced from the upper end of the outer member, and a helical spring confined between the enlargement on the inner member and the upper end of the outer member and exerting its pressure to urge the members toward a vertically separated position upon compression thereof, said spring being confined between the enlargement on the inner member and the upper end of the outer member under torsion also to urge the outer member in one rotative direction with respect to the inner member to resiliently retain the projection within the offset portion of the connecting slot even during axial movement of the members relative to each other.

3. A releasable coupling device including, an outer tubular member adapted to be connected to the upper end of a section of well pipe, an inner member telescoping the outer member and connected to the lower end of a second section of well pipe, the outer member having a slot therein which is formed with a vertical leg, a lateral leg and a vertical offset portion at the end of the lateral leg, said vertical leg extending from the upper end of said outer tubular member, a projection on the inner member engageable within the offset portion for coupling the members together, an enlargement on the inner member spaced from the upper end of the outer member, a helical spring confined between the enlargement on the inner member and the upper end of the outer member and exerting its pressure to urge the inner member longitudinally upwardly relative to the outer member to normally maintain said projection at the upper end of the vertical offset portion, radial abutments on the inner and outer members engaged by the ends of the helical spring, said spring being compressible to permit limited downward movement of said inner mandrel relative to said outer member, said spring being confined under torsion also between said radial abutments to urge the outer member in one direction rotatively relative to the inner member to maintain the projection within the offset portion of the slot during rotation of the members in either direction and also during relative longitudinal movement of the members.

4. A releasable coupling device as set forth in claim 3, together with a clutch collar surrounding the inner member and interposed between the abutment on the outer member and the lower end of the spring, whereby the spring pressure which tends to impart rotation to the outer member is transmitted to the outer member through said clutch collar.

5. A releasable coupling device including, an outer tubular member adapted to be connected to the end of a section of well pipe, an inner member telescoping the outer member and adapted to be connected to the end of a second section of well pipe, one of said members having a slot therein which is formed with a vertical leg, a lateral leg, and a vertical offset portion at the end of the lateral leg, said vertical offset portion extending above said lateral leg to form an upper offset and extending below said lateral leg to form a lower offset, a projection on the other of said members engageable within said slot and positionable in either said upper offset or said lower offset for coupling the members together during a rotation of the members, said vertical leg having an open end through which said projection is adapted to pass to move said projection out of said slot, a first abutment on said outer member, a second abutment on said inner member, and a coil spring confined between the members under torsion with one end of said spring in engagement with said first abutment and the other end of said spring in engagement with the said second abutment for rotatably urging the projection into engagement with the wall of said vertical offset portion remote from the lateral leg of the slot to prevent unintentional movement of said projection into said lateral leg when said projection is moved vertically in said offset portion from said upper offset to said lower offset or from said lower offset to said upper offset, thereby preventing unintentional release of said members from each other during relative longitudinal movement thereof.

6. The structure set forth in claim 5, including an enlargement on the inner member spaced from the upper end of the outer member, and wherein said resilient means comprises a helical spring which is confined between said enlargement on the inner member and the upper end of the outer member.

7. A releasable coupling device including, an outer tubular member adapted to be connected to the end of a section of well pipe, an inner member telescoping the outer member and adapted to be connected to the end of a second section of well pipe, the outer members having a slot therein which is formed with a vertical leg, a lateral leg, and a vertical offset portion at the end of the lateral leg, said vertical offset portion extending above said lateral leg to form an upper offset and extending below said lateral leg to form a lower offset, a projection on the inner member engageable within said slot and positionable in either said upper offset or said lower offset for coupling the members together during a rotation of the members, said vertical leg having an open end through which said projection is adapted to pass to move said projection out of said slot, a first abutment on said outer member, a second abutment on said inner member, and a coil spring confined between the members under torsion with one end of said spring in engagement with said first abutment and the other end of said spring in engagement with the said second abutment for rotatably urging the projection into engagement with the wall of said vertical offset portion remote from the lateral leg of the slot to prevent unintentional movement of said projection into said lateral leg when said projection is moved vertically in said offset portion from said upper offset to said lower offset or from said lower offset to said upper offset, thereby preventing unintentional release of said members from each other during relative longitudinal movement thereof.

8. A releasable coupling device including, an outer tubular member, an inner member telescoping the outer member, one of the members having a slot in its wall, a projection on the other member engaging within said slot, a coil spring confined between said members, a first abutment on said outer member and a second abutment on said inner member with one end of said spring engaging said first abutment and the other end of said spring engaging said second abutment, said spring being confined under torsion between said abutments and exerting its pressure to normally urge the members rotatively relative to each other to maintain the projection within the slot during rotation of the members as a unit in either direction and also during telescoping movement of the members.

9. The releasable coupling device set forth in claim 5, including a clutch collar surrounding the inner member and releasably positioned on said outer member, said second abutment being provided on said clutch collar, whereby the spring pressure which tends to impart rotation to the outer member is transmitted to the outer member through said clutch collar.

10. The releasable coupling device set forth in claim 8, including a clutch collar surrounding the inner member and releasably positioned on said outer member, said second abutment being provided on said clutch collar, whereby the spring pressure which tends to impart rotation to the outer member is transmitted to the outer member through said clutch collar.

References Cited in the file of this patent

UNITED STATES PATENTS

| Number | Name | Date |
|---|---|---|
| 404,575 | Swenson | June 4, 1889 |
| 782,595 | Bulger | Feb. 14, 1905 |
| 1,130,726 | Greve | Mar. 9, 1915 |
| 1,282,681 | Faribault | Oct. 22, 1918 |
| 1,301,958 | Mendenhall | Apr. 29, 1919 |
| 1,611,831 | Gates | Dec. 21, 1926 |
| 2,049,289 | Burns et al. | July 28, 1936 |
| 2,049,290 | Burns | July 28, 1936 |
| 2,056,496 | White | Oct. 6, 1936 |
| 2,099,048 | Burns et al. | Nov. 16, 1937 |
| 2,696,367 | Robinshaw | Dec. 7, 1954 |